United States Patent
Li et al.

(10) Patent No.: US 9,285,527 B2
(45) Date of Patent: Mar. 15, 2016

(54) BACKLIGHT MODULE

(71) Applicant: Shenzhen China Star Optoelectronics Technology Co., Ltd., Shenzhen (CN)

(72) Inventors: Dehua Li, Shenzhen (CN); Shih Hsiang Chen, Shenzhen (CN); Li-Yi Chen, Shenzhen (CN)

(73) Assignee: SHENZHEN CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 13/812,525

(22) PCT Filed: Jan. 18, 2013

(86) PCT No.: PCT/CN2013/070677
§ 371 (c)(1),
(2) Date: Jan. 28, 2013

(87) PCT Pub. No.: WO2014/107918
PCT Pub. Date: Jul. 17, 2014

(65) Prior Publication Data
US 2015/0323727 A1    Nov. 12, 2015

(30) Foreign Application Priority Data
Jan. 8, 2013 (CN) .......................... 2013 1 0006364

(51) Int. Cl.
F21V 7/04 (2006.01)
F21V 8/00 (2006.01)

(52) U.S. Cl.
CPC .............. *G02B 6/0008* (2013.01); *G02B 6/005* (2013.01); *G02B 6/0028* (2013.01); *G02B 6/0088* (2013.01)

(58) Field of Classification Search
CPC .... G02B 6/0006; G02B 6/001; G02B 6/0005; G02B 6/4298
See application file for complete search history.

(56) References Cited

U.S. PATENT DOCUMENTS

| | | | |
|---|---|---|---|
| 5,005,939 A * | 4/1991 | Arvanitakis | G02B 6/4204 257/701 |
| 6,386,768 B1 | 5/2002 | Yoon et al. | |
| 2009/0109706 A1 | 4/2009 | Hsu | |
| 2013/0343589 A1 | 12/2013 | Thomason et al. | |
| 2014/0125915 A1 | 5/2014 | Chen | |
| 2014/0132881 A1* | 5/2014 | Hu | G02F 1/133602 349/61 |

FOREIGN PATENT DOCUMENTS

| | | |
|---|---|---|
| CN | 1273367 A | 11/2000 |
| CN | 2550788 Y | 5/2003 |

(Continued)

*Primary Examiner* — Andrew Coughlin
(74) *Attorney, Agent, or Firm* — Mark M. Friedman

(57) ABSTRACT

The present invention discloses a backlight module, comprising at least one back plate, a light guide plate, an optical film, a base, a plurality of fasteners and a plurality of optical fibers. The light guide plate is disposed in the back plate; the optical film is disposed on the light guide plate; the base is installed at one side of the light guide plate, and comprising a plurality of corresponding holes spaced with each other; the fasteners are fastened on the corresponding holes; each of the fasteners comprises a pressing hole; the optical fibers used for transmitting a light source are passed through the pressing holes; the optical fibers are tightly fixed by the fasteners. Fasteners are passed through the corresponding holes to narrow the pressing hole; Optical fibers are pressed and fixed to prevent the axial movement of optical fibers and to stabilize transmission quality of light source.

5 Claims, 5 Drawing Sheets

(56) References Cited

349/61

FOREIGN PATENT DOCUMENTS

| CN | 101071230 | A | 11/2007 |
| CN | 201041322 | Y | 3/2008 |
| CN | 201130839 | Y | 10/2008 |
| CN | 101419312 | A | 4/2009 |
| CN | 102073166 | A | 5/2011 |
| CN | 102966911 | A | 3/2013 |
| JP | 2006039503 | A | 2/2006 |
| KR | 20120007141 | A | 1/2012 |
| KR | 20120059649 | A | 6/2012 |

* cited by examiner

BACKLIGHT MODULE

FIELD OF THE INVENTION

The present invention relates to a backlight module, and more particularly to a backlight module for fixing the optical fiber.

BACKGROUND OF THE INVENTION

Liquid crystal display (LCD) has been widely used in a variety of electronic products, most of the liquid crystal display is a backlit liquid crystal display, which is composed by the liquid crystal display panel and a backlight module, the backlight module is divided into two type, side-light type and direct-light type, according to the different light incident position, The direct-light type means that the light sources (e.g. cold cathode fluorescent lamp, light emitting diode) are arranged in the back of the liquid crystal panel in an array manner, the light is emitted and passed through the optical film (e.g. diffusion plate, prism sheet) to form an uniform surface light. The side-light type means that the light source, i.e. the LED light bar, is placed at the side of the liquid crystal panel, the light source emits light into the light guide plate, so that the linear light is converted into an uniform surface light by the light guide plate to thus provide a backlight to the LCD panel.

The light source of the backlight module can be light emitting diode (LED) or cold cathode fluorescent lamp (CCFL), which require to emit white light by mixing lights through phosphor powders, and thus the light has weaker color performance and narrow color gamut to difficultly provide a true color image. Furthermore, the light source of the backlight module will consume more power, especially for large-size liquid crystal display.

Therefore, to solve the above technical defects, it is necessary to provide a backlight of environment-friendly and natural light source, wherein intact sunlight having broad spectrum and full color is guided into the LCD backlight module through the optical fibers, and LCD monitors can perfectly perform true colors by improving the stability of the optical fibers to avoid the displacement of the optical fibers.

SUMMARY OF THE INVENTION

A primary object of the present invention is to provide a backlight module, wherein the fasteners pass through the corresponding holes to narrow the pressing holes, and thus the optical fibers are pressed and fixed to prevent the axial movement of the optical fibers.

A secondary object of the present invention is to provide a backlight module, wherein the fasteners pass through the corresponding holes to narrow the pressing holes, and thus the optical fibers are pressed and fixed to stabilize the transmission quality of the light source.

To achieve the above object, the present invention provides a backlight module which comprises: at least one back plate; a light guide plate disposed in the back plate; an optical film disposed on the light guide plate; a base installed at one side of the light guide plate and comprising a plurality of corresponding holes spaced with each other; a plurality of fasteners fastened in the corresponding holes, respectively, each of the fasteners comprising a pressing hole; and a plurality of optical fibers for transmitting a light source and passed through the pressing holes, respectively, wherein the optical fibers are tightly fixed by the fasteners.

Furthermore, the present invention provides another backlight module which comprises: a light guide; a base installed at one side of the light guide plate and comprising a plurality of corresponding holes spaced with each other; a plurality of fasteners fastened in the corresponding holes, respectively, each of the fasteners comprising a pressing hole, respectively; and a plurality of optical fibers for transmitting a light source and passed through the pressing holes, respectively, wherein the optical fibers are tightly fixed by the fasteners.

In one embodiment of the present invention, each of the fasteners further comprises: a body abutted against a surface of the base, and two fixing feet extended from a bottom of the body and passed through the corresponding holes, wherein each of the pressing holes is formed between the two fixing feet of each of the fasteners.

In one embodiment of the present invention, each of the corresponding holes comprises two protrusions, and each of the fasteners further comprises two slots which are formed on the two fixing feet, respectively, for engaging with the protrusions.

In one embodiment of the present invention, each of the fasteners further comprises two engaging hooks connected with one end of the fixing feet for engaging with the bottom of the base.

In one embodiment of the present invention, the base further comprises a plurality of alignment slots communicated with both sides of each of the corresponding holes for installing the optical fiber.

In one embodiment of the present invention, each of the fasteners further comprises: a surrounding wall defining the pressing hole, and a gap formed on the surrounding wall and communicated with the pressing hole.

In one embodiment of the present invention, each of the fasteners further comprises a positioning groove surrounding a surface of the surrounding wall for engaging with the base.

In one embodiment of the present invention, the radius of one end of the surrounding wall is tapered.

In one embodiment of the present invention, the light source is sunlight.

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, and etc., are only directions by referring to the accompanying drawings, and thus the used directional terms are used to describe and understand the present invention, but the present invention is not limited thereto.

Figure 1:
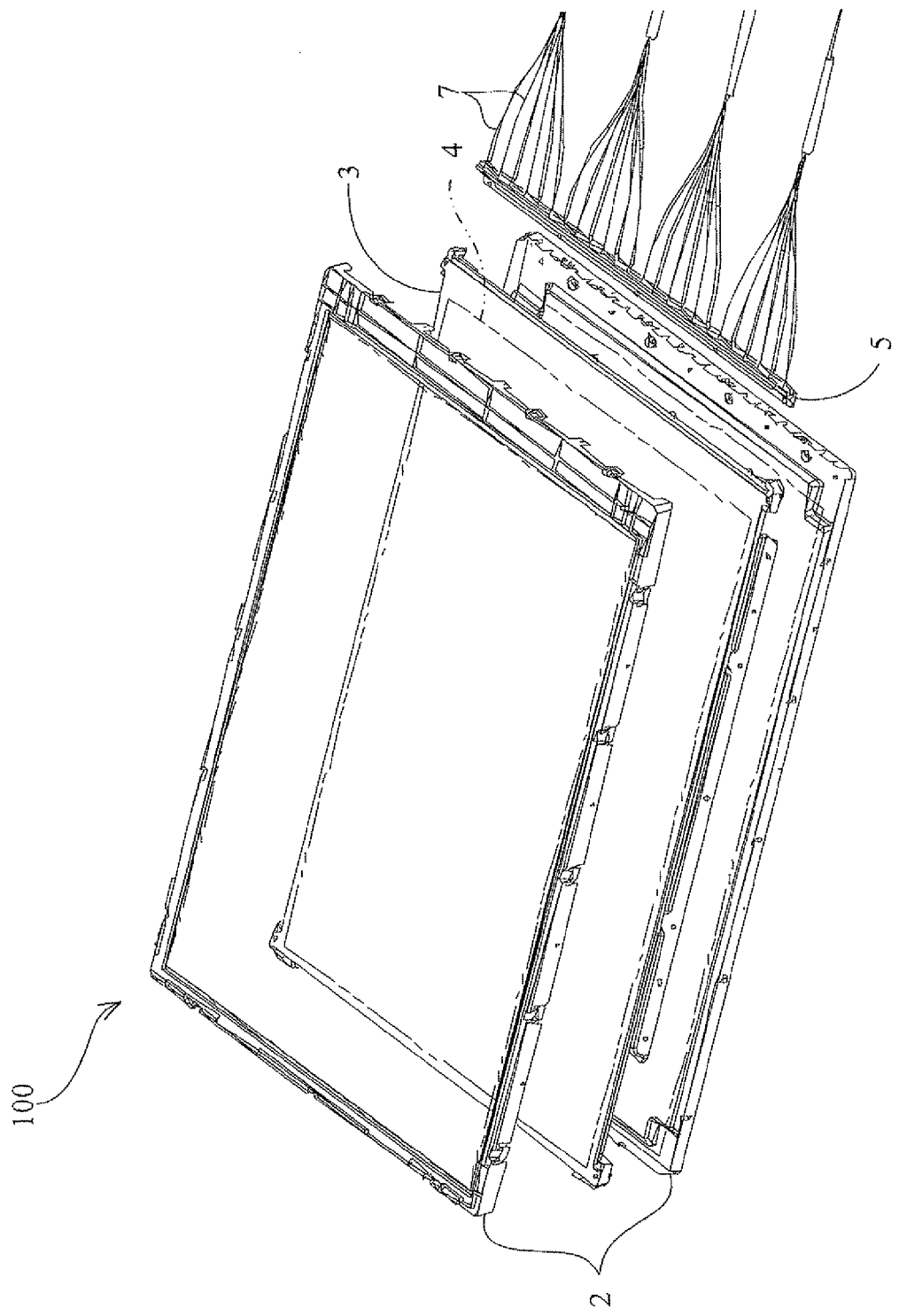
FIG. 1 is a perspective view of the backlight module according to a first embodiment of the present invention.

Referring now to FIG. 1, a backlight module 100 according to a first embodiment of the present invention is illustrated. As shown, the backlight module 100 comprises two back plate 2 (or a plate), a light guide plate 3, an optical film 4, a base 5, and a plurality of optical fibers 7, wherein the light guide plate 3 is disposed in the back plate 2, the optical film 4 is disposed on the light guide plate 3, the base 5 is installed at one side of the light guide plate 3, wherein the backlight module 100 is applied to the field of liquid crystal display (LCD). In order to give the above object, features and advantages of the present invention more apparent hereinafter, the present invention will be described in detail as follows by preferred embodiments and with the accompanying drawings, and will hereinafter use of the detailed description of each of the above components.

Figure 2:
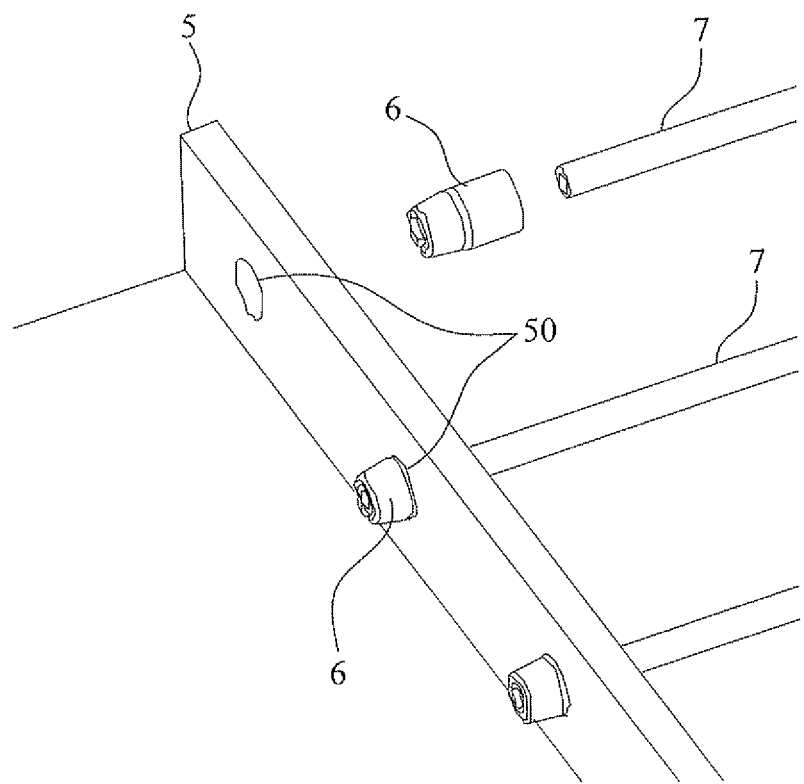
FIG. 2 is a partially perspective view of the backlight module according to FIG. 1.

Referring to FIGS. 1 and 2, in the first embodiment of the present invention, the backlight module further comprises a plurality of fasteners 6, and the base 5 comprises a plurality of corresponding holes 50 spaced with each other, wherein the fasteners 6 are fastened in the corresponding holes 50, respectively. The back plate 2 are made of opaque material, e.g. plastic material, metal material or the combination of the above material, for carrying the light guide plate 3. The light guide plate 3 is formed by injection molding, and the material thereof is light curing type resin, including methyl methacrylate (PMMA) or polycarbonate (PC). The optical film 4 can be diffusion sheet, prism sheet, turning prism sheet, brightness enhancement film (BEF), dual brightness enhancement film (DBEF), diffused reflective polarizer film (DRPF), or any combination thereof.

Figure 3:
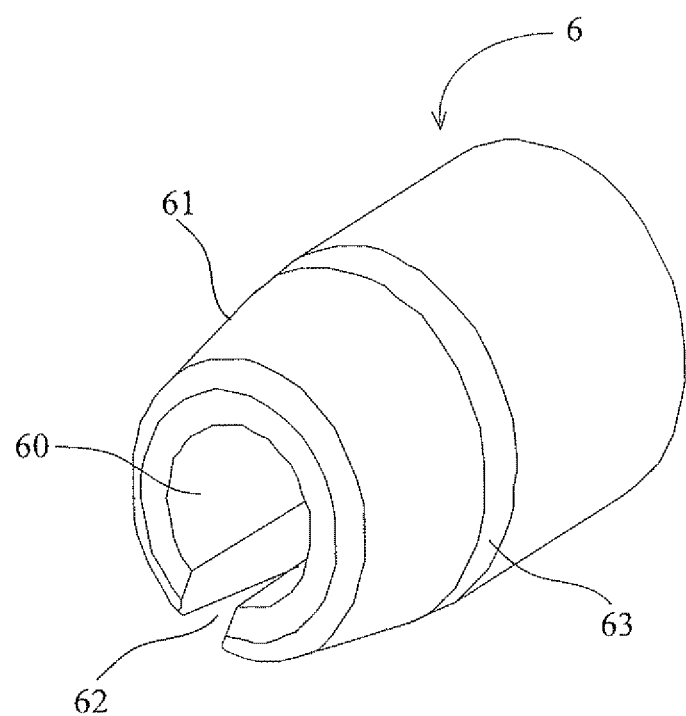
FIG. 3 is a perspective view of a fastener of the backlight module according to the first embodiment of the present invention.

Referring to FIGS. 2 and 3, each of the fasteners 6 is cylindrical, and comprises a pressing hole 60, a surrounding wall 61, a gap 62 and a positioning groove 63, wherein the surrounding wall 61 defines the pressing hole 60; the gap 62 is formed on the surrounding wall 61 and communicated with the pressing hole 60; and the positioning groove 63 surrounds a surface of the surrounding wall 61 for engaging with the base 5. The radius of one end of the surrounding wall 61 is tapered. In addition, the optical fiber 7 has a fiber core which is made of quartz or methyl methacrylate (PMMA) for transmitting a light source (e.g. sunlight), and the optical fibers 7 is passed through the pressing holes 60, respectively, wherein the optical fibers 7 are tightly fixed by the fasteners 6. Preferably, material of the fasteners 6 may be plastic or rubber and other materials to prevent from crushing the optical fibers 7.

The optical fibers 7 can gather external natural light (such as sunlight) and transmit it into the light guide plate 3, when the backlight module 100 is used to provide backlights. The backlights need to be converted into an uniform surface light source for an LCD display, because each of the optical fibers 7 is a point light source with a narrow light emitting angle. Therefore, as shown in FIG. 1, the optical fibers 7 are arranged in a row, and then emit lights into the light guide plate 3. After this, the guide plate 3 is converted into an uniform surface light source by dots of the light guide plate 3 and optical effects of the optical film 4.

As described above, the cylindrical fastener 6 is cylindrical and has the gap 62. Thus, when the fasteners 6 are passed through the corresponding holes 50, the surrounding wall 61 is pressed toward the gap 62 and used to narrow the aperture of the pressing hole 60, and thus the optical fibers are pressed and fixed to prevent the axial movement of the optical fibers and to stabilize the transmission quality of the light source (e.g., sunlight).

Figure 4:
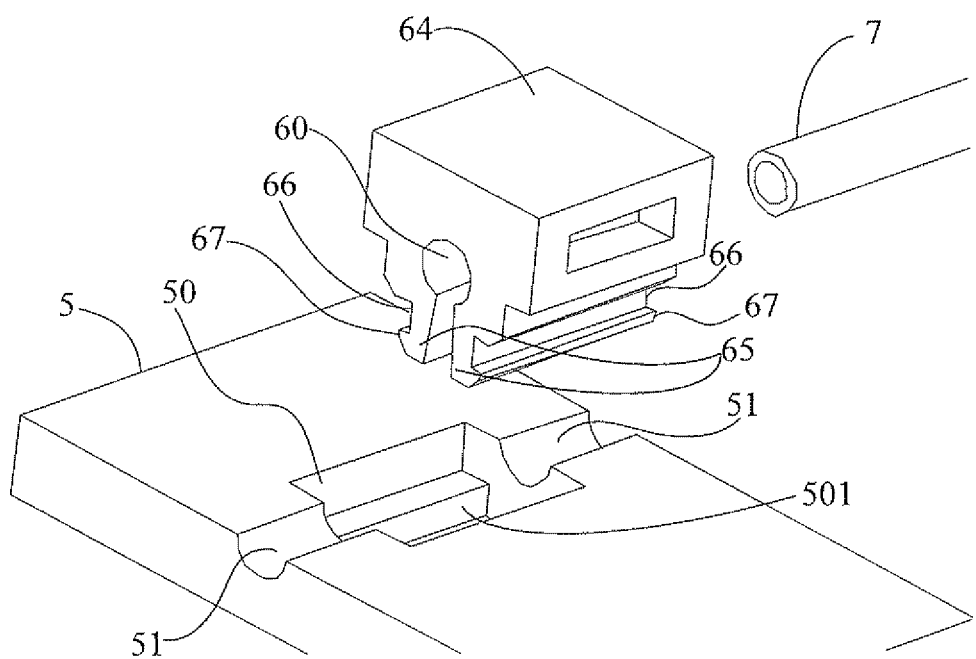
FIG. 4 is a partially perspective view of the backlight module according to a second embodiment of the present invention.
Figure 5:
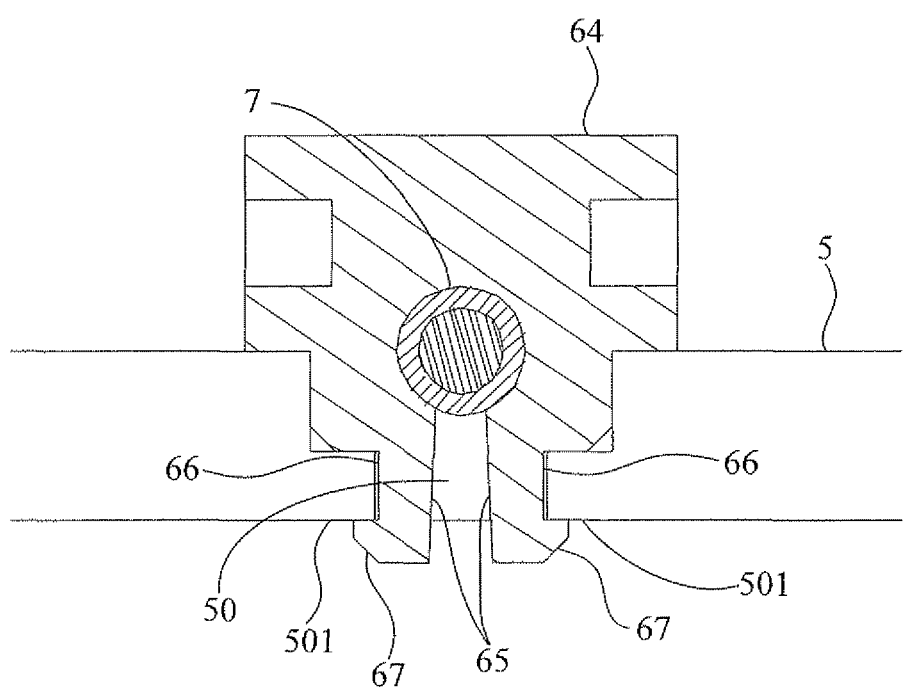
FIG. 5 is a cross-sectional view of the backlight module according to the second embodiment of the present invention.

Referring now to FIGS. 4 and 5, a backlight module 100 according to a second embodiment of the present invention is illustrated and similar to the first embodiment, so that the second embodiment uses similar terms or numerals of the first embodiment. As shown, the difference of the second embodiment is that each of the fasteners 6 comprises a pressing hole 60, a body 64, two fixing feet 65, two slots 66 and two engaging hooks 67, wherein the body 64 is abutted against a surface of the base 5; the fixing feet 65 is extended from a bottom of the body 64 and passed through the corresponding holes 50, wherein each of the pressing holes 60 is formed between the two fixing feet 65 of each of the fasteners 6; each of the corresponding holes 50 comprises two protrusions 501; and the slots 66 are formed on the two fixing feet, respectively, for engaging with the protrusions 501. Each of the fasteners 6 further comprises two engaging hooks 67 connected with one end of the fixing feet 65 for engaging with the bottom of the base 5. In addition, the base 5 further comprises a plurality of alignment slots 51 communicated with both sides of each of the corresponding holes 50 for installing the optical fiber 7.

As described above, the fixing feet 65 is passed through the corresponding holes 50 and pressed inward, in order to narrow the aperture of the pressing hole 60 to thus prevent the axial movement of the optical fibers and to stabilize the transmission quality of the light source. Furthermore, the protrusions 501 are embedded in the slots 66 to strengthen the fixation of the fasteners 6 on the base 5. Moreover, the optical fibers 7 are placed in the alignment slots 51 to avoid the horizontal movement of the optical fibers 7.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A backlight module, comprising:
   at least one back plate;
   a light guide plate disposed in the back plate;
   an optical film disposed on the light guide plate;
   a base installed at one side of the light guide plate and comprising a plurality of corresponding holes spaced with each other;
   a plurality of fasteners fastened in the corresponding holes, respectively, each of the fasteners comprising a pressing hole; and
   a plurality of optical fibers for transmitting a light source and passed through the pressing holes, respectively, wherein the optical fibers are tightly fixed by the fasteners, and each of the fasteners is cylindrical and comprises a surrounding wall defining the pressing hole, a gap formed on the surrounding wall and communicated with the pressing hole, and a positioning groove surrounding a surface of the surrounding wall for engaging with the base, and a material of the fasteners is plastic or rubber.

2. The backlight module according to claim 1, wherein the radius of one end of the surrounding wall is tapered.

3. The backlight module according to claim 1, wherein the light source is sunlight.

4. A backlight module, comprising:
   a light guide;
   a base installed at one side of the light guide plate and comprising a plurality of corresponding holes spaced with each other;

a plurality of fasteners fastened in the corresponding holes, respectively, each of the fasteners comprising a pressing hole, respectively; and a plurality of optical fibers for transmitting a light source and passed through the pressing holes, respectively, wherein the optical fibers are tightly fixed by the fasteners, and each of the fasteners is cylindrical and comprises a surrounding wall defining the pressing hole, a gap formed on the surrounding wall and communicated with the pressing hole, and a positioning groove surrounding a surface of the surrounding wall for engaging with the base, and a material of the fasteners is plastic or rubber.

5. A backlight module, comprising:

a base comprising a plurality of corresponding holes spaced with each other;

a plurality of fasteners fastened in the corresponding holes, respectively, each of the fasteners comprising a pressing hole, respectively; and a plurality of optical fibers for transmitting a light source and passed through the pressing holes, respectively, wherein the optical fibers are tightly fixed by the fasteners, and each of the fasteners is cylindrical and comprises a surrounding wall defining the pressing hole, and a gap formed on the surrounding wall and communicated with the pressing hole, and a positioning groove surrounding a surface of the surrounding wall for engaging with the base, and a material of the fasteners is plastic or rubber.

\* \* \* \* \*